(12) United States Patent
Dahl et al.

(10) Patent No.: US 9,325,161 B2
(45) Date of Patent: Apr. 26, 2016

(54) UNIVERSAL ELECTRICAL RECEPTACLE COVER

(71) Applicant: Trystar, Inc., Faribault, MN (US)

(72) Inventors: Frederick Alan Dahl, Dundas, MN (US); James Jerome Koberg, Morristown, MN (US); Brian Allen Amacher, Faribault, MN (US)

(73) Assignee: Trystar, Inc., Faribault, MN (US)

( * ) Notice: Subject to any disclaimer, the term of this patent is extended or adjusted under 35 U.S.C. 154(b) by 99 days.

(21) Appl. No.: 14/095,378

(22) Filed: Dec. 3, 2013

(65) Prior Publication Data
US 2015/0155691 A1    Jun. 4, 2015

(51) Int. Cl.
*H02G 3/14* (2006.01)
*H02G 3/08* (2006.01)
*H02G 3/10* (2006.01)

(52) U.S. Cl.
CPC ................. *H02G 3/088* (2013.01); *H02G 3/10* (2013.01); *H02G 3/14* (2013.01)

(58) Field of Classification Search
CPC ...................................................... H02G 3/081
USPC ....................................................... 174/66, 67
See application file for complete search history.

(56) References Cited

U.S. PATENT DOCUMENTS

| D227,989 | S | 7/1973 | Geisel |
| 4,176,758 | A | 12/1979 | Glick |
| 5,571,023 | A * | 11/1996 | Anthony ................. 439/142 |
| 5,588,853 | A * | 12/1996 | Anthony ................. 439/136 |
| 6,423,900 | B1 * | 7/2002 | Soules ...................... 174/66 |
| D476,628 | S | 7/2003 | Millar |
| 6,708,834 | B2 | 3/2004 | Hagerman, III |
| 7,170,015 | B1 | 1/2007 | Roesch et al. |
| D539,229 | S | 3/2007 | Murphey |
| 7,554,034 | B2 * | 6/2009 | Smith ..................... 174/53 |
| D596,154 | S | 7/2009 | Rivkin |
| D605,139 | S | 12/2009 | Moore |
| 7,709,735 | B2 * | 5/2010 | Vigorito et al. ........... 174/67 |
| D629,366 | S | 12/2010 | Ericson |
| 8,618,416 | B2 * | 12/2013 | Rothbaurer et al. ....... 174/67 |
| D709,461 | S | 7/2014 | Dahl et al. |

* cited by examiner

*Primary Examiner* — Dhirubhai R Patel
(74) *Attorney, Agent, or Firm* — Fredrikson & Byron, P.A.

(57) ABSTRACT

A universal receptacle cover for an electrical receptacle is provided. The universal receptacle cover includes a base, a neck supported by the base, and a cap coupled to the neck, the cap moving between an open configuration and a closed configuration. In some cases, a portion of the universal receptacle cover consists essentially of a material transparent to visible light. In some cases, the universal receptacle cover is sized and shaped to completely cover standard electrical receptacles when the cap is in the closed configuration.

18 Claims, 11 Drawing Sheets

UNIVERSAL ELECTRICAL RECEPTACLE COVER

FIELD OF THE INVENTION

The present invention generally relates to electrical receptacle covers for covering electrical receptacles.

BACKGROUND OF THE INVENTION

Electrical receptacles with a high current rating are found in a variety of different settings, including commercial, industrial and residential settings. Because these receptacles have a high current rating, they include a number of safety features. First, electrical receptacles are typically color-coded to represent different functions of electrical terminals. Standard color codes include yellow, green, brown and white codes, among others. Operators use the color codes to make sure that the appropriate connectors (such as plugs and sockets) are safely connected to the receptacles.

Electrical receptacles are also covered to provide added safety and to prevent damage to the receptacle. The receptacle covers are also colored to match the color-code of the electrical receptacle and/or connectors. Receptacle covers are prone to damage after repetitive opening and closing. If a receptacle cover is damaged, repair technicians typically visit the receptacle site to replace the receptacle cover. Often times, repair technicians replace several receptacle covers in a single visit.

Electrical receptacles also have a variety of different standard sizes and shapes depending on the receptacle type. As such, repair technicians also need to be stocked with a variety of sizes and shapes of colored receptacle covers. However, repair technicians still often run out of stock of the needed cover type during the visit.

Receptacles also have male configurations (e.g., plugs) and female configurations (e.g., sockets). Operators often need to open receptacle covers to determine the configuration of the receptacle. Unnecessary openings of receptacle covers can be dangerous, especially with high current rating receptacles.

It would be desirable to provide an improved receptacle cover that offers ease of use, low cost installation and maintenance and increased safety.

SUMMARY

The invention includes a universal receptacle cover. The universal receptacle cover fits all standard sizes and shapes of receptacles. The universal receptacle cover is also transparent such that it allows operators to view both the color and the configuration of receptacle without having to open the cover. The universal receptacle cover provides several advantages. First, manufacturers only need to make a single receptacle cover rather than making several colors having different sizes and colors. The universal receptacle cover greatly reduces manufacturing costs.

Also, repair technicians need only carry a stock of universal receptacle covers rather than keeping track of and restocking covers with different sizes and colors. Thus, the universal receptacle cover improves the installation process.

Further, once the universal receptacle cover is installed, an operator can view both the color and the configuration of the receptacle without having to open the cover. As such, an operator need not open the cover to determine the configuration, which results in added safety. Also, less frequent opening of the cover makes the cover less prone to damage, thereby prolonging the life of the cover. Thus, the universal receptacle cover improves maintenance.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

FIGS. 1-6 show views of a universal receptacle cover 100 according to some embodiments of the invention. The receptacle (not shown) can be any commercially available receptacle adapted to receive a mating electrical connector. The receptacle can have any standard size and shape. As used herein, the term "standard electrical receptacle" means any commercially available receptacle. Commercially available receptacles include receptacles manufactured by Leviton, Cooper-Crouse Hinds, SMS, Marinco, Paramount and Hubbel, among other manufacturers. In some cases, the receptacle is a single pin receptacle such as a Cam-Lok™ receptacle, a receptacle manufactured by Cooper-Crouse Hinds. In particular cases, the receptacle is a 16 series Cam-Lok™ 400 amp connector. The universal receptacle cover 100 also has a size and shape that allows the cover to fit a variety of standard receptacles, including the receptacles listed above.

As used herein, the term "transparent material" means any material that is transparent to visible light. In some cases, the transparent material is a colorless transparent material. Also, whenever the term "comprises" is used, this term can instead be "consisting essentially of" or "consisting of."

Moving from the receptacle outward, the universal receptacle cover 100 includes a base 102, a neck 104 and a cap 106. In some cases, at least the cap 106 comprises transparent material. In other cases, at least the neck 104 and the cap 106 comprises transparent material. In yet other cases, at least the base 102, the neck 104 and the cap 106 comprises transparent material. In some cases, substantially the entire or the entire receptacle cover 100 comprises transparent material. In FIGS. 1-11, the receptacle cover 100 is shown as an opaque solid merely to facilitate ease of viewing.

The transparent material can be any material that is transparent to visible light. In some cases, the transparent material is a colorless material that is transparent to visible light. In some embodiments, the transparent material comprises polymeric material. In certain cases, the transparent material comprises a thermoplastic polymer such as polymethyl methacrylate (PMMA), polycarbonate, polyethylene terephthalate (PET) or another similar polymer.

Figure 4:
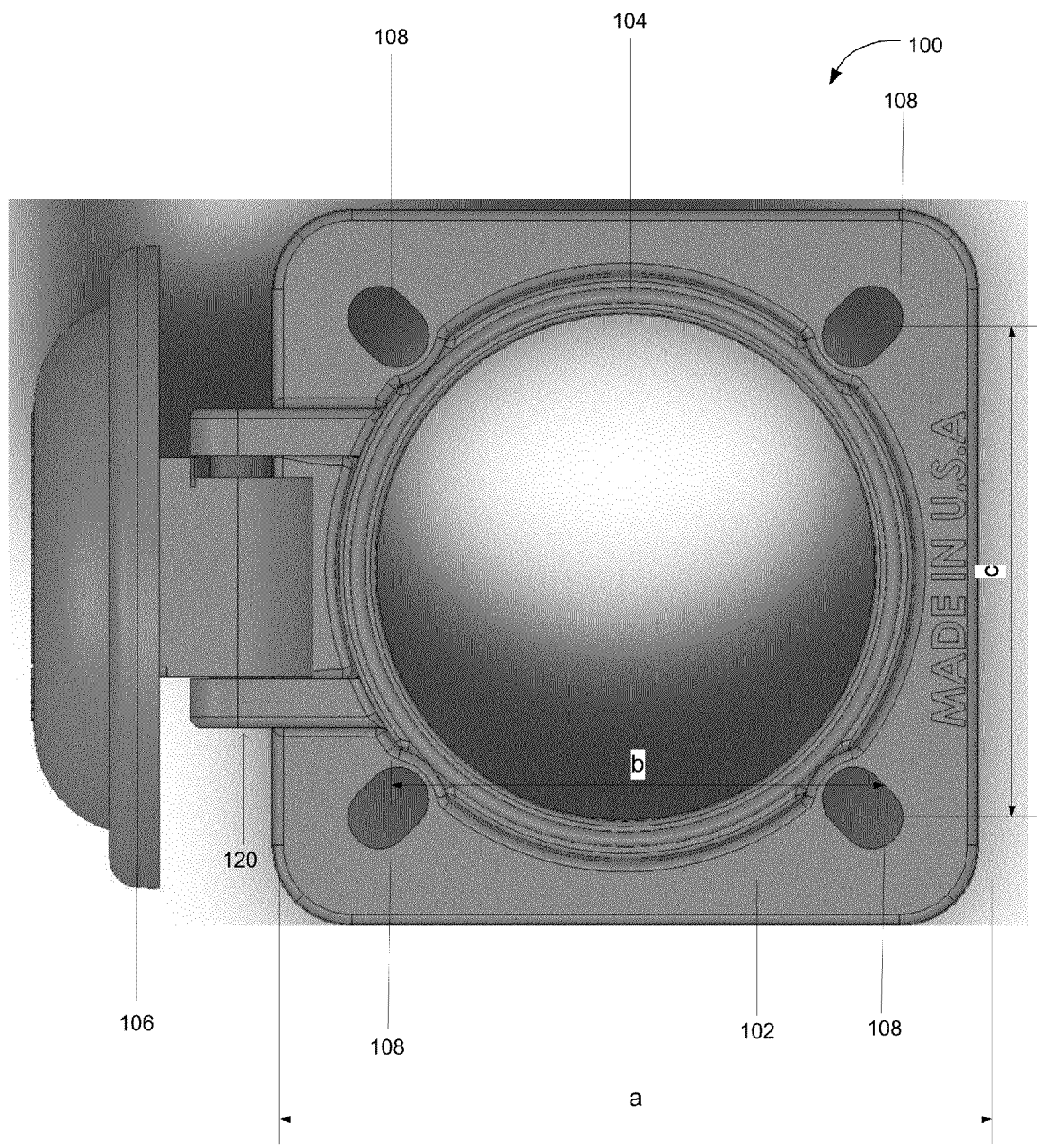
FIG. 4 is a view from the top of the cover of FIG. 1.

The receptacle cover 100 includes a base 102. The dimensions of the base 102 are provided to fit various standard sized receptacles. The base 102 can be a square-shaped base, as illustrated. The square-shaped base has dimensions that correspond to a square with an outer side length "a" and an inner side length "p," as shown in FIG. 4.

The outer side length "a" is the side length of an outermost wall of the base 102. In some embodiments, the outer side length "a" has a length of at least about 1.5 inches. In other embodiments, the outer side length "a" has a length of between about 1.5 inches and about 3 inches. In certain cases, the outer side length "a" is about 2.25 inches.

The inner side length "p" is the side length of an innermost wall of the base 102. In some embodiments, the inner side length "p" has a length of at least about 1.5 inches. In certain embodiments, the inner side length "p" has a length of between about 1.5 inches and about 2 inches. In certain cases, the inner side length "p" is between about 1.7 inches and about 2 inches.

Figure 6:
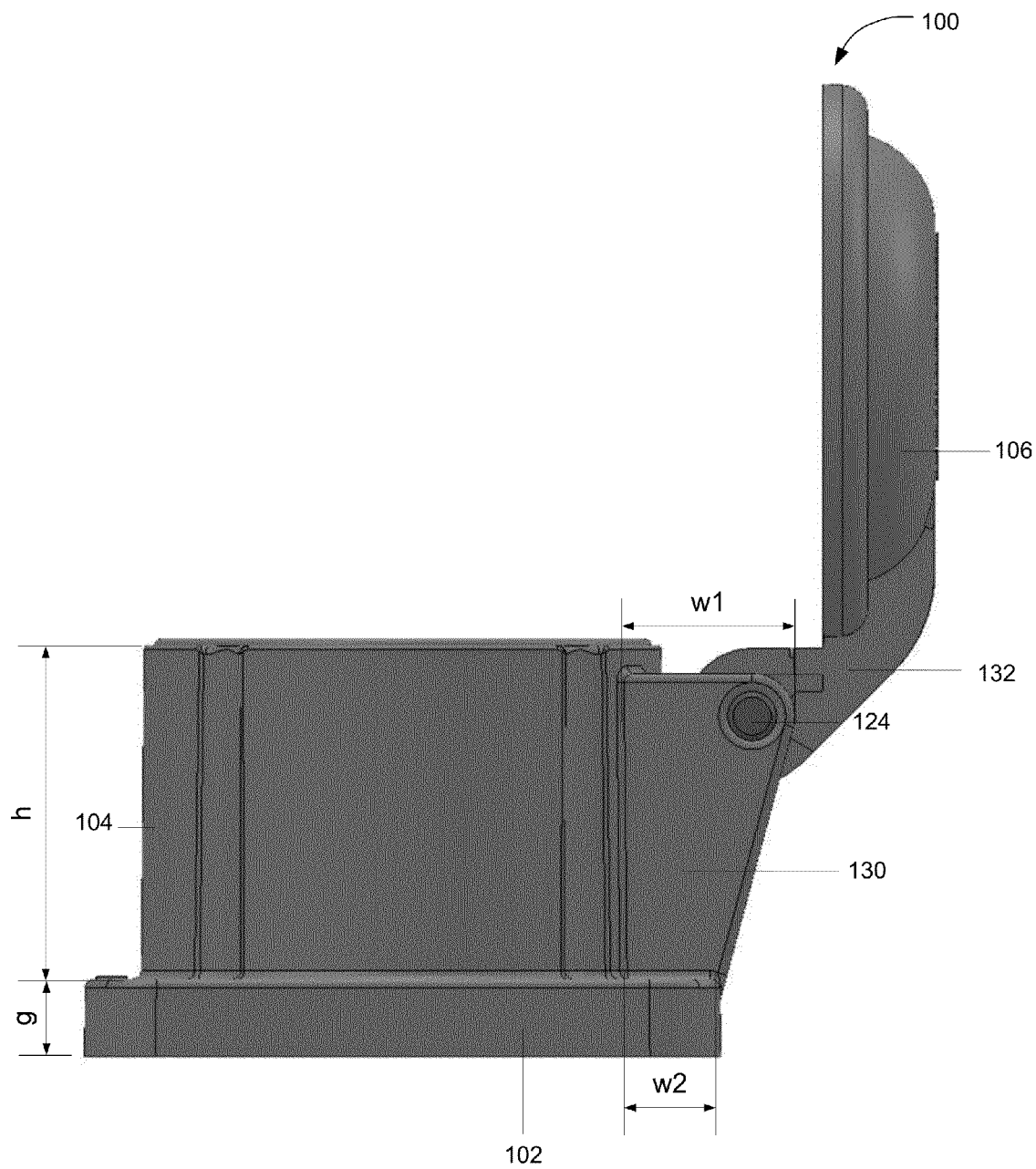
FIG. 6 is a view from the side of the cover of FIG. 1.

The base 102 also has a base height "g" as shown in FIG. 6. The base height "g" is the height of the base only. In other words, the base height "g" extends from a bottom of the base 102 to a top of the base. In some embodiments, the base height "g" is at least about 0.1 inches. The base height "g" can be between about 0.1 inches and about 0.9 inches. In certain cases, the base height "g" is about 0.28 inches.

Figure 5:
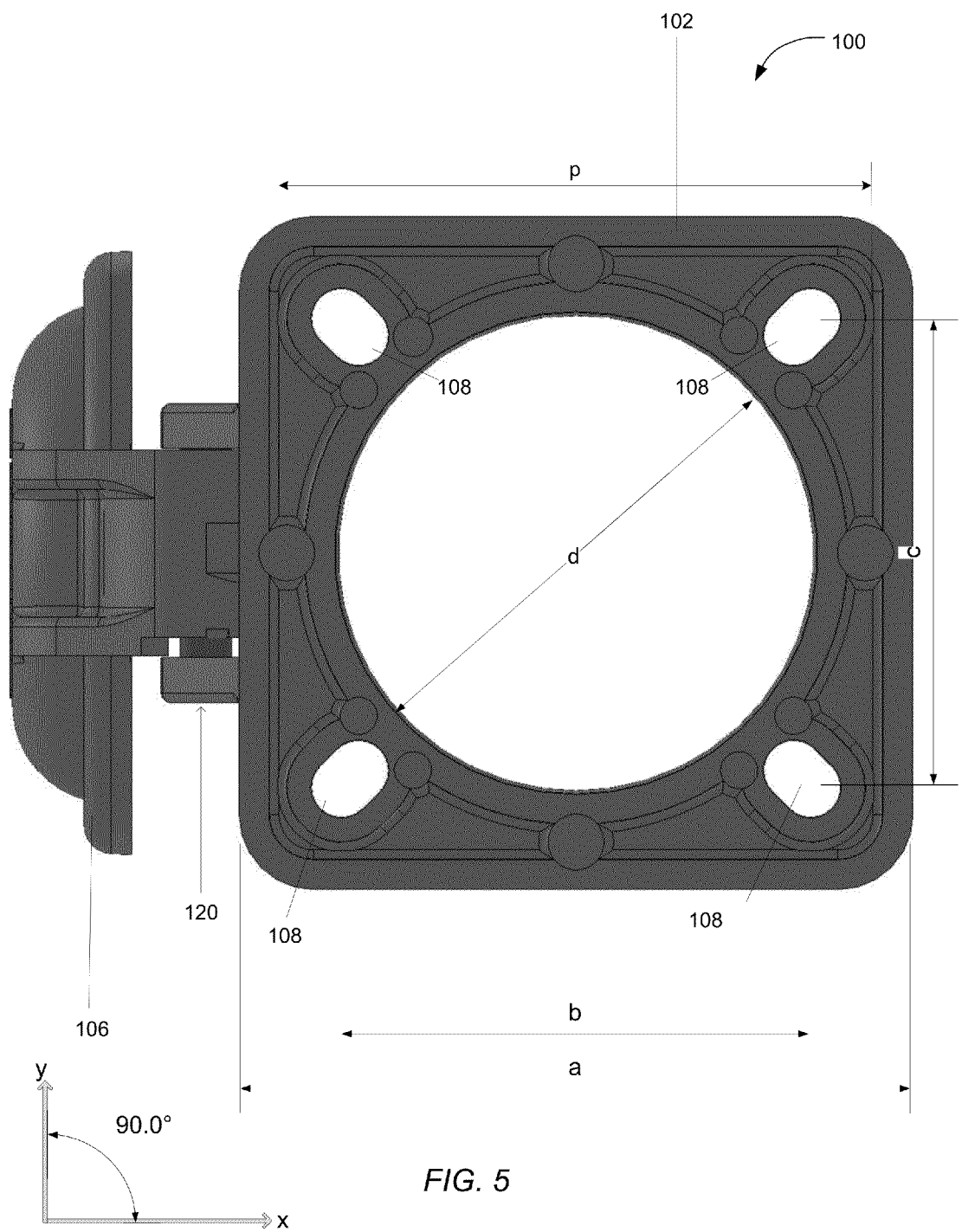
FIG. 5 is a view from the bottom of the cover of FIG. 1.

The receptacle cover 100 also includes a plurality of slots 108 positioned on the base 102. The illustrated slots 108 are positioned symmetrically on the base 102. The slots 108 are sized and shaped to act as a universal fastener support and receive any fastener and fastener head type, such as buttonhead, socket-cap, round, hex-head fasteners and the like. As shown in FIG. 5, the slots 108 can also be machined through the base 102 so that they form through-recesses.

Figure 7:
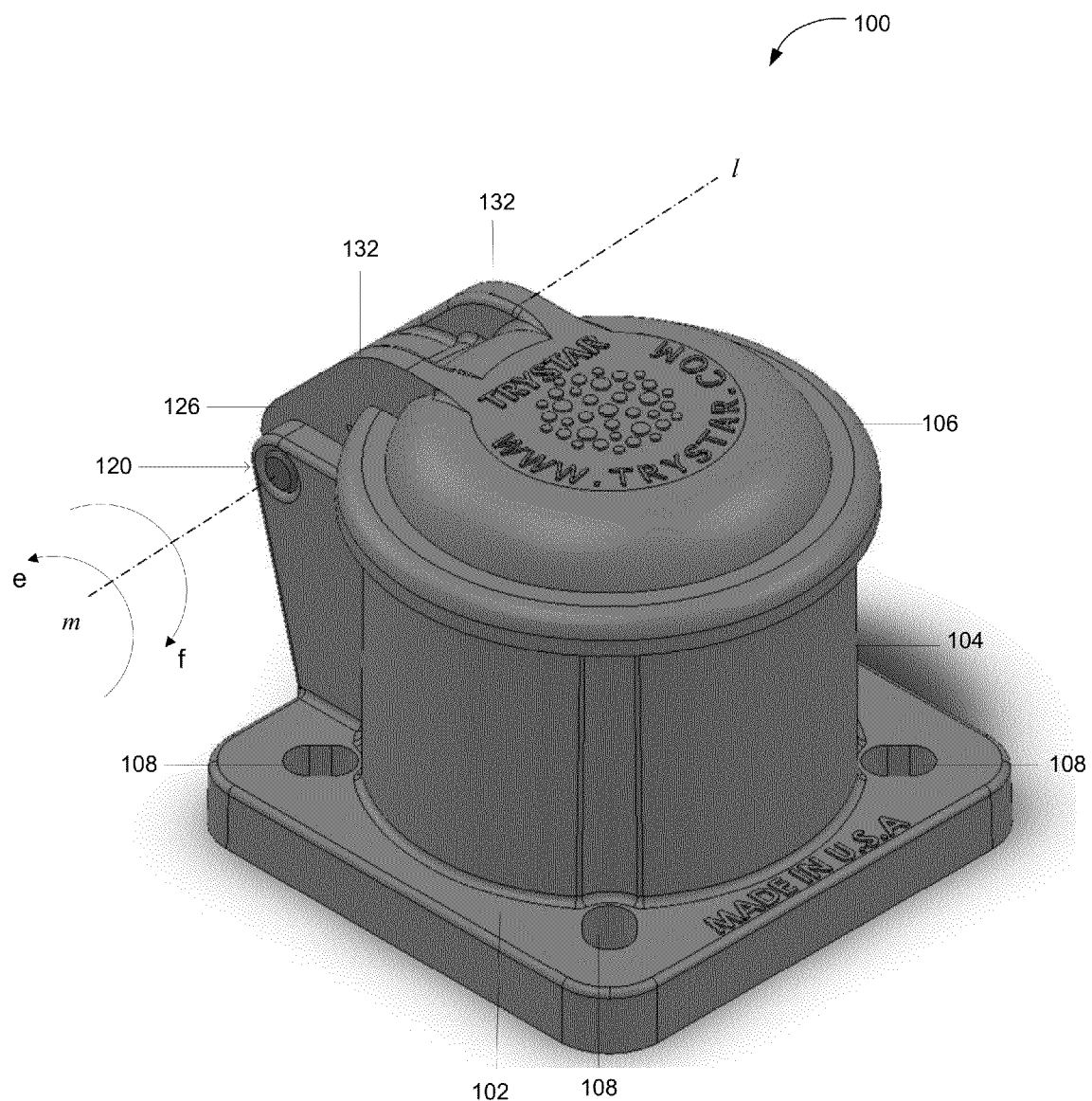
FIG. 7 is an upper perspective view of the cover of FIG. 1 in a closed configuration.

The illustrated slots 108, as shown in FIGS. 5 and 7, are oval shaped. In some embodiments, the slots are oval-shaped slots having a length of at least about 0.2 inches and a width of at least about 0.18 inches. In certain embodiments, the oval-shaped slots have a length of about 0.28 inches and a width of about 0.2 inches.

In some embodiments, the slots 108 are positioned such that the center of the slots are spaced by a distance "b" apart, as seen in FIGS. 4 and 5. In some embodiments, the slots 108 can be at a distance "b" apart in a first direction "x" and a distance "c" apart in a second direction "y". In some embodiments, the distances "b" and "c" can be approximately equal. In certain embodiments, the distance "b" or "c" is at least about 1.2 inches. In some cases, the distance "b" or "c" can be between about 1.2 inches and about 2.6 inches. In some cases, the distance "b" or "c" can be about 1.58 inches.

The receptacle cover 100 also includes a neck 104. In certain cases, the neck 104 is integrally formed with the base 102, although this is not required. The neck 104 can be cylindrical in shape, with an inner neck diameter "d" and a neck height "h" as best seen in FIGS. 5 and 6. In other embodiments, the neck 104 can have other shapes, such as a frustoconical shape.

The inner neck diameter "d" of the neck 104 is the diameter taken from the innermost wall of the neck. The inner neck diameter "d" is sized and shaped to receive the outer circumference of a variety of standard receptacles, including the standard receptacles listed above. In some embodiments, the inner neck diameter "d" is at least about 1.2 inches. In certain embodiments, the inner neck diameter "d" is between about 1.2 inches and about 2.5 inches. In certain cases, the neck diameter "d" of the neck 104 is between about 1.4 inches and about 1.9 inches.

The neck height "h" is the height of the neck only. In some embodiments, the neck has a neck height "h" of at least about 1 inch. In certain embodiments, the neck has a neck height "h" of between about 1 inch and about 2 inches. In certain cases, the neck height "h" is about 1.18 inches.

In certain embodiments, the neck 104 also includes one or more posts 130. The posts 130 can be integrally formed with the neck 104 or simply coupled to the neck 104. The posts 130 can be of any shape and are wedged-shaped in the illustrated embodiment. The posts 130 span a portion of the height of the neck 104 and are adapted to provide unitary support to a cap 106. In some embodiments, the posts 130 span at least 80% of the height of the neck 104. In certain embodiments, the posts 130 span substantially the entire height or the entire height of the neck 104.

The posts 130 can also have a width "w1" at a widest portion and a width "w2" at a narrowest portion. Each the widest portion and the narrowest portion can be portions that extend in a direction outward and away from the neck 104. In some embodiments, the widest part is a topmost portion of the posts 130 and the narrowest part is a bottommost portion of the posts 130. Also, in some cases, the bottommost portion of the posts 130 are coupled to the base 102. In certain cases, the bottommost portion of the posts 130 are coupled to a top surface of the base 102. The posts 130 can be integrally formed with the base 102 or simply coupled to the base 102.

In some embodiments, the width "w1" is at least about 0.36 inches. In certain embodiments, the width "w1" is between about 0.36 inches and about 0.8 inches. In certain cases, the width "w2" is between about 0.2 inches and about 0.35 inches. In exemplary embodiments, the widths "w1" and "w2" are about 0.48 inches, and 0.31 inches respectively.

Figure 1:
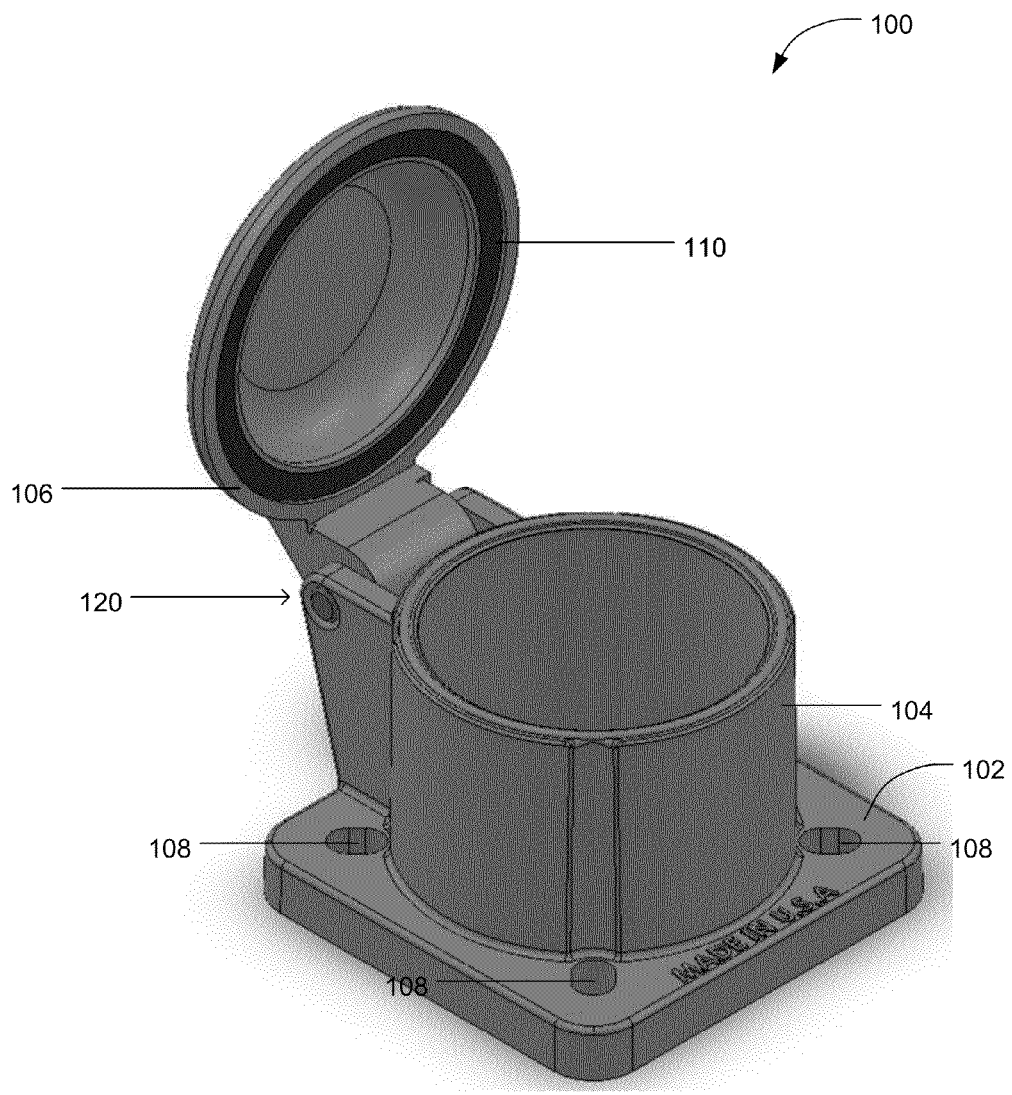
FIG. 1 is an upper perspective view of a receptacle cover 100 in an open configuration according to some embodiments of the invention.
Figure 2:
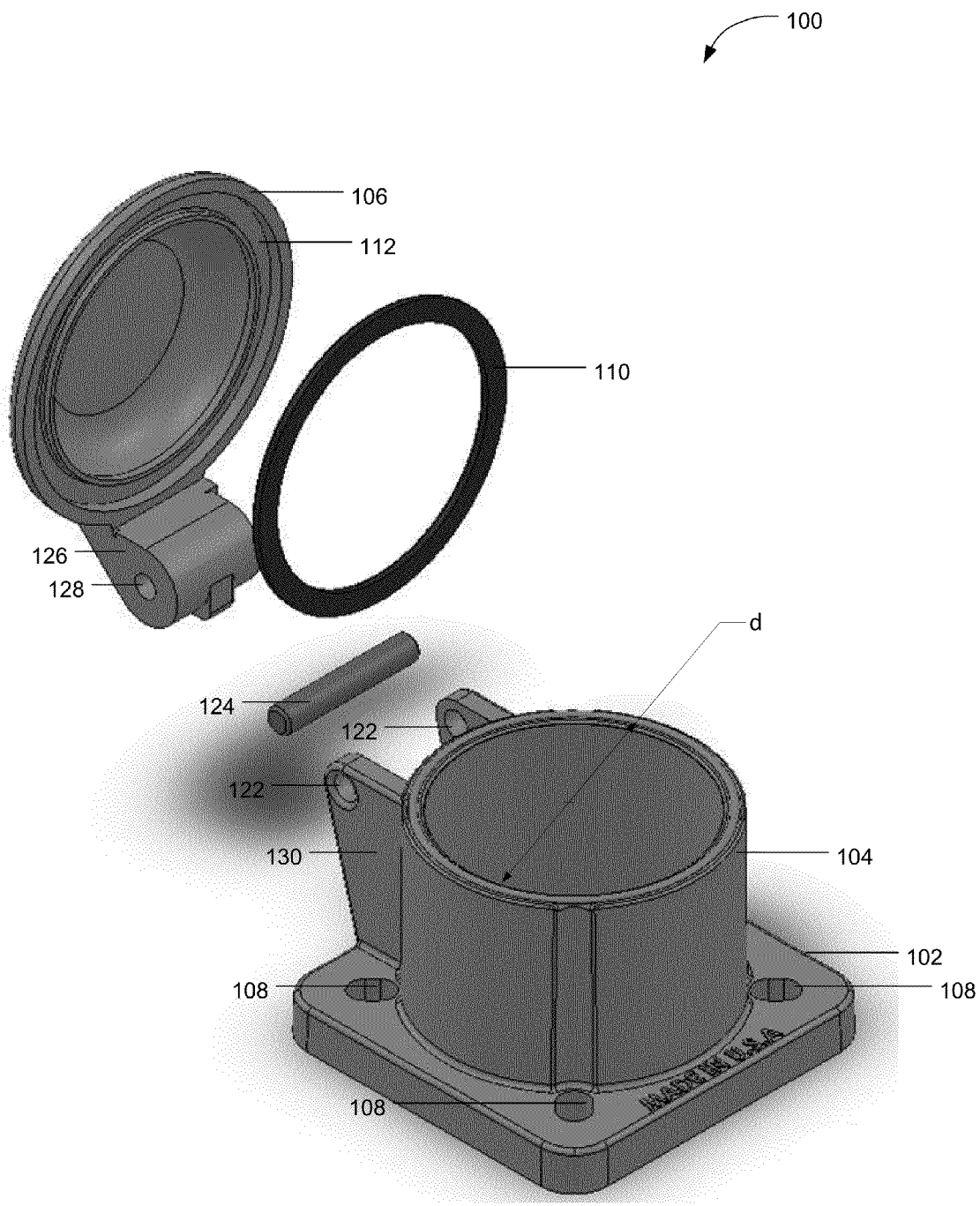
FIG. 2 is an exploded perspective view of the cover of FIG. 1.

Referring to FIG. 2, the posts 130 support the cap 106. The cap 106 operably engages with the neck 104 and moves between an open configuration, as illustrated in FIGS. 1-6, and a closed configuration, as illustrated in FIGS. 7-11. When the cap 106 is in the open configuration, it provides access to the interior of the neck 104. When the cap 106 is in the closed configuration, it prevents access to the interior of the neck 104.

Figure 3:
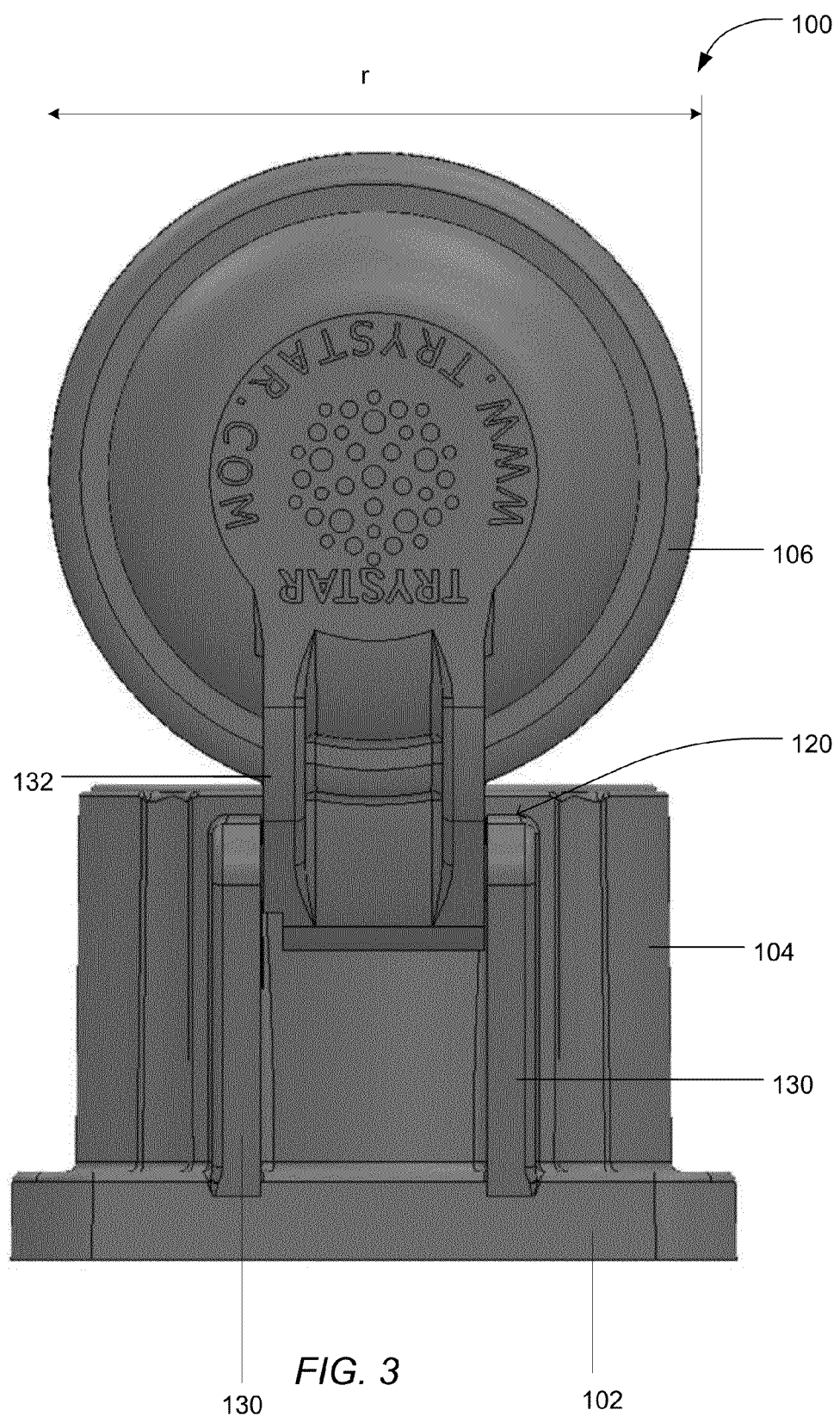
FIG. 3 is a view from the back of the cover of FIG. 1.

The cap 106 can have any desired shape that extends beyond the inner neck diameter "d" of the neck 104. In some embodiments, the cap 106 has a shape that corresponds to the shape of the neck 104. In some embodiments, the cap 106 has a circular shape. In certain embodiments, as shown in FIG. 3, the cap 106 has an outer cap diameter "r." The outer cap diameter "r" is the diameter taken from the outermost surface of the cap 106. In certain cases, the outer cap diameter "r" is a diameter that is larger than the inner neck diameter "d" of the neck 104.

The cap 106 is also operably coupled to the neck 104 such that it moves between an open configuration and a closed configuration. In some embodiments, the cap 106 is coupled pivotally with the neck 104 and pivots between an open configuration and a closed configuration. In certain embodiments, the cap 106 is coupled pivotally with the posts 130 through a connection mechanism 120.

Figure 8:
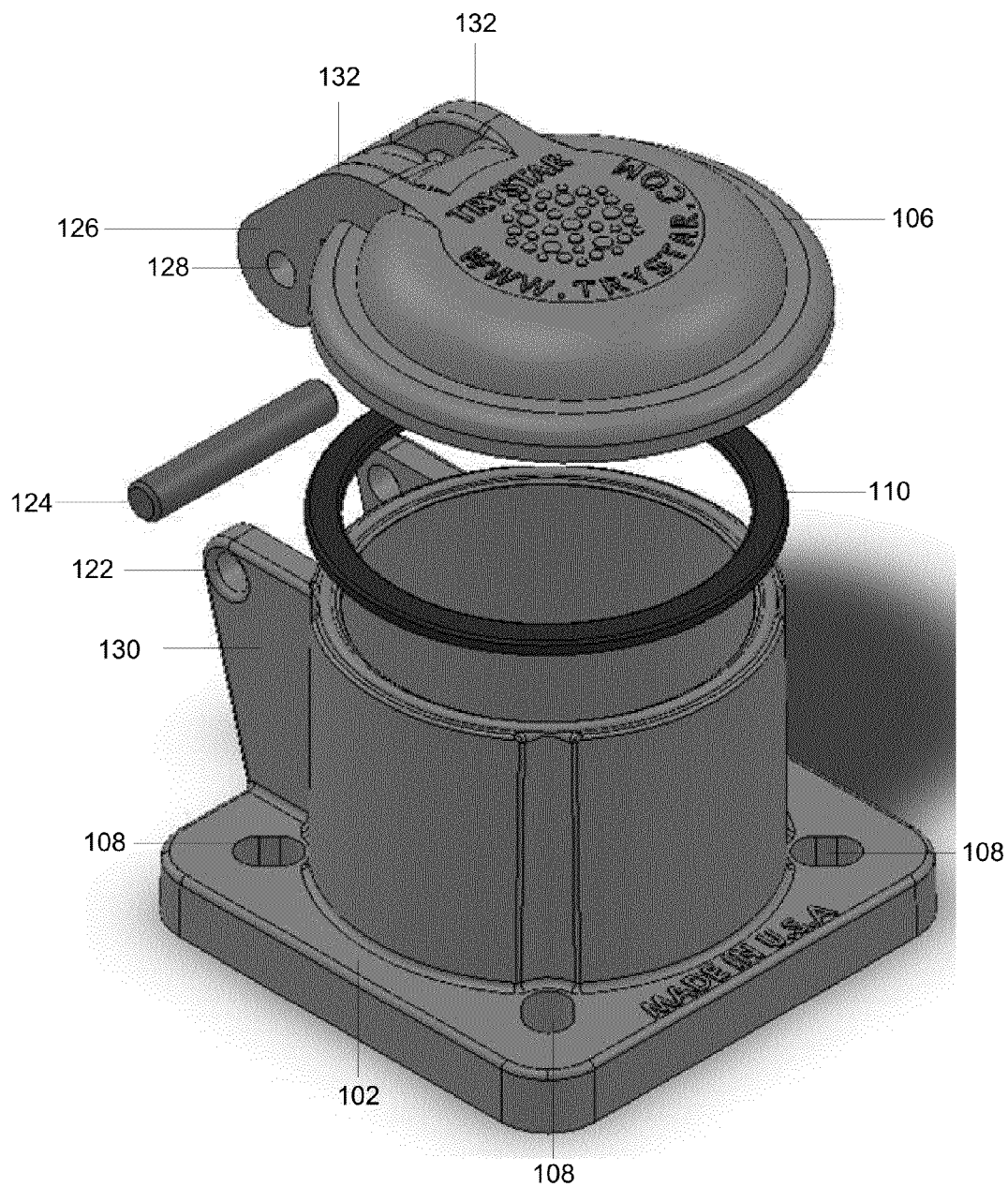
FIG. 8 is an exploded perspective view of the cover of FIG. 7.
Figure 9:
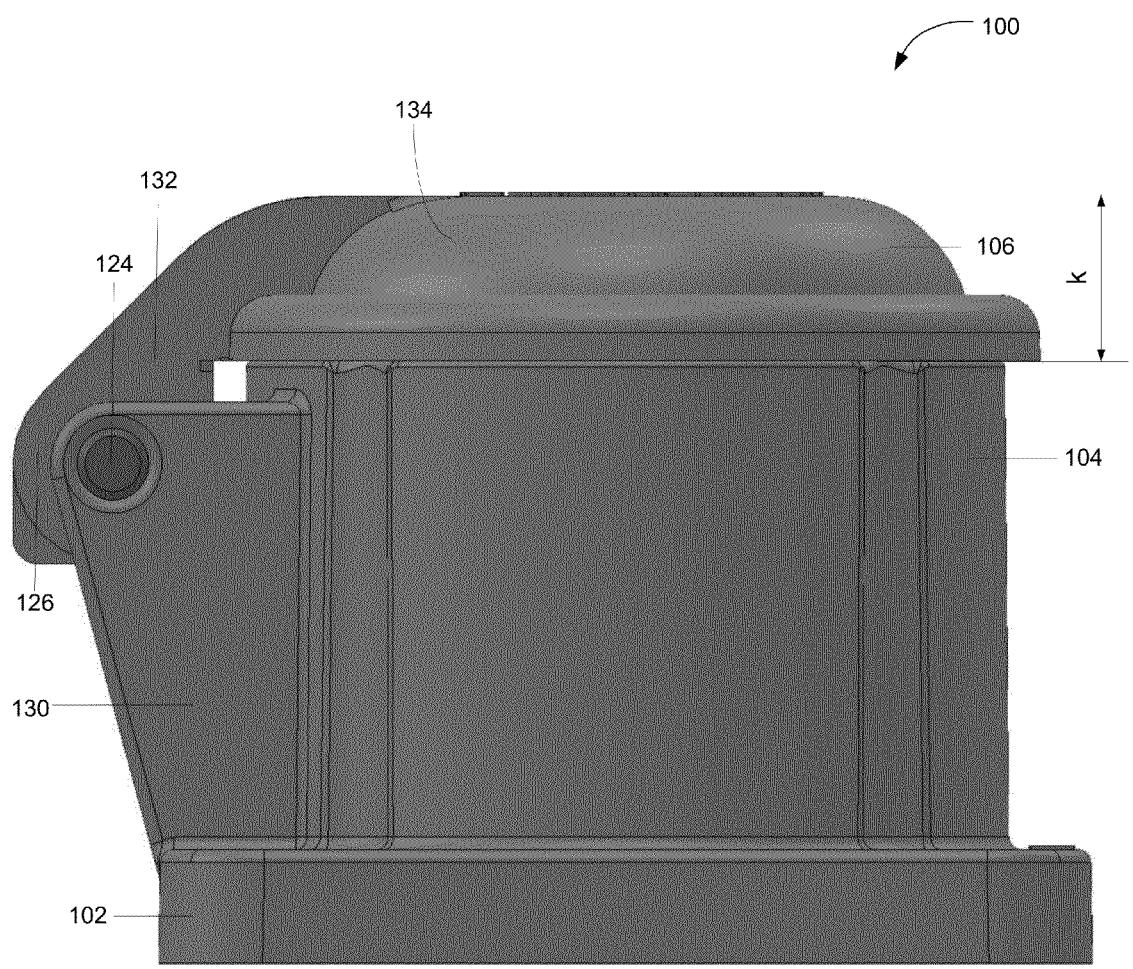
FIG. 9 is a view from the side of the cover of FIG. 7.
Figure 10:
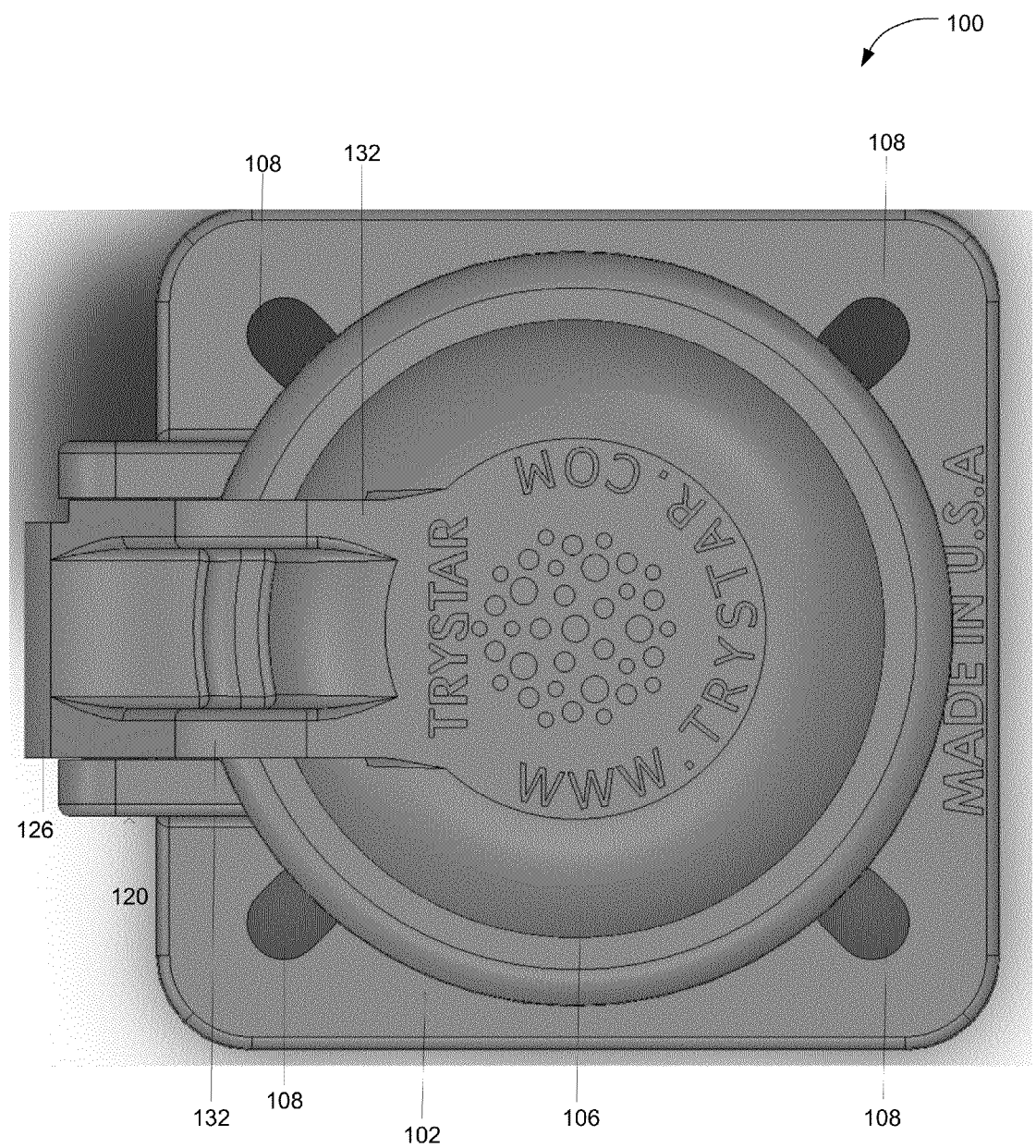
FIG. 10 is a view from the top of the cover of FIG. 7.
Figure 11:
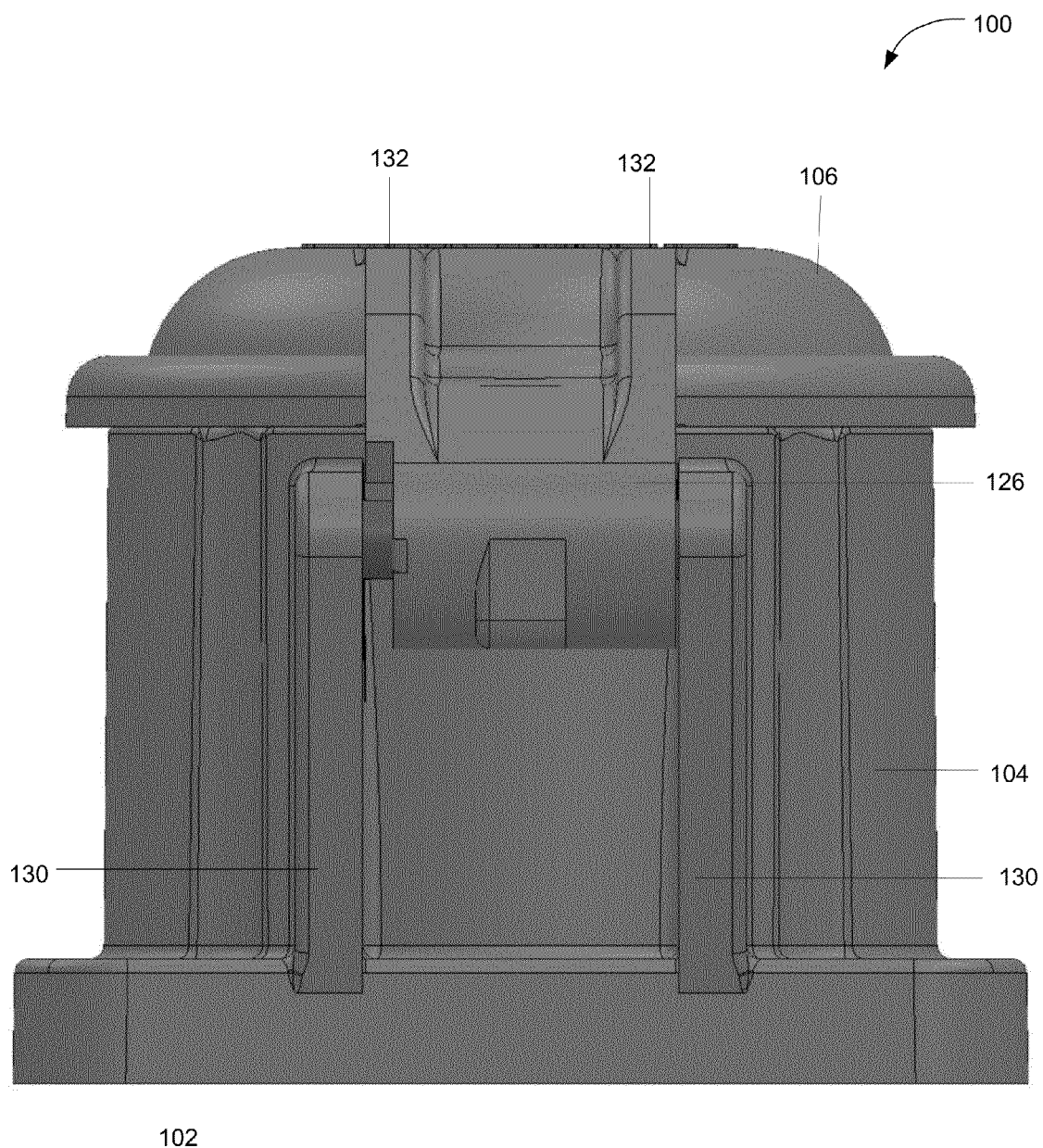
FIG. 11 is a view from the back of the cover of FIG. 7.

The connection mechanism is best shown in FIGS. 8 and 9. In this embodiment, the cap 106 includes one or more arms 132 that form a bracket 126. The bracket 126 and arms 132 are integrally formed with cap 106 in the illustrated embodiment.

The bracket 126 includes a through-hole 128. The posts 130 also include a through-hole 122 located peripherally on the posts 130. A hinge pin 124 inserts into the through-holes 122, 128. The connection mechanism 120 causes the cap 106 to pivotally rotate about the hinge axis "l-m", as shown in FIG. 7. The cap 106 rotates in a direction "e" about the hinge axis "l-m" to move from the closed configuration to the open configuration, and in a direction "f" about the hinge axis "l-m" to move from the open configuration to the closed configuration. The bracket 126 and arms 132 couple the rotational motion of the hinge pin 124 to the cap 106, such that if the cap 106 rotates in a given direction, the hinge pin 124 also rotates in the same direction and vice versa.

In certain embodiments, additional elements, such as a torsion spring (not shown) may be wound about the hinge pin 124 to facilitate moving the cap 106 between open and closed configuration, and vice versa. The torsion spring can provide a snap-back action to close the cap 106. The torsion spring may store a quantity of mechanical energy when the cap 106 is rotated in the direction "e" from the closed configuration to the open configuration, and release the mechanical energy to move the cap 106 from the open position to the closed position.

Further, as best shown in FIG. 2, the cap 106 includes a domed portion 134 an annular recess 112 in some embodiments. The domed portion 134 is located centrally within the cap. The annular recess 112 is located outward of the domed portion 134 and at a periphery of the cap 106. The domed portion 134 can have any desired size and shape that allows standard receptacles of varying height to fit inside of the receptacle cover 100 when the cap 106 is in a closed configuration. In the illustrated embodiment, the domed portion 134 has a circular dome shape.

The annular recess 112 is adapted to receive a gasket 110. The annular recess 112 and gasket 110 can be of any size, and in some embodiments, they can be of an annular area representing approximately 1%-10% of the area of the cap 106. The gasket 110 can comprise a material such as neoprene, Teflon, PTFE, graphite, fiberglass, silicone etc. The gasket 110 is adapted to form a snug fit between the cap 106 and the neck 104. In some embodiments, the gasket 110 can form a hermetic seal to prevent any foreign substances such as dust or suspended particles from entering the receptacle. The gasket 110 can yield and tightly fill the recess of the cap 106. In some embodiments, the gasket 110 can deform under a compressive load due to the weight of the cap 106 such that it can conform to the shape of any irregularities in the annular recess 112 and neck 104 that may have occurred during fabrication.

The cap 106 also has a cap height "k." The cap height "k" is the maximum height of the cap 106 that extends between a bottommost surface and a top most surface. In some embodiments, the cap height "k" is a length of at least about 0.3 inches. In certain embodiments, the cap height "k" is a length of between about 0.3 inches and about 0.6 inches. In certain cases, the cap height "k" is about 0.38 inches. As seen in FIGS. 5 and 9, and from the dimensions of the neck height "h" specified herein, the neck height "h" can thus be greater than the cap height "k" to allow the receptacle cover 100 to completely cover standard electrical receptacles when the cap 106 is in the closed configuration.

An electrical receptacle (not shown) can be covered by placing the universal receptacle cover 100 such that the base 102 of the receptacle cover 100 mates with a standard sized receptacle. Fasteners such as screws (not shown) can be positioned in slots 108 to operatively connect the receptacle cover 100 to the receptacle. Once connected, the universal receptacle cover 100 provides visual access to the electrical receptacle. More specifically, the color and the male/female configuration of the electrical receptacle can easily be discerned because one or more portions of the universal receptacle cover 100 is transparent to visible light, allowing a user to see the receptacle.

The universal receptacle cover 100 also eliminates the need to match the color of the receptacle cover to the color of the electrical receptacle. The universal receptacle cover 100 also eliminates the need to match the size of the receptacle cover to the size of the electrical receptacle. As such, the universal receptacle cover 100 eliminates the problem of a repair technician not carrying adequate receptacle covers of several colors and sizes.

In the foregoing detailed description, the invention has been described with reference to specific embodiments. However, it may be appreciated that various modifications and changes can be made without departing from the scope of the invention.

What is claimed is:

1. A universal receptacle cover for a standard electrical receptacle, comprising:
   a base;
   a neck supported by the base, the neck having an inner neck diameter and a neck height, the neck adapted to receive a standard electrical receptacle;
   a cap pivotally coupled to and supported by the neck, the cap having an outer diameter and a cap height, the cap being movable between an open configuration and a closed configuration;
   a connection mechanism comprising a hinge pin and a bracket, the hinge pin being received by the bracket and the neck, the hinge pin having a hinge axis the connection mechanism adapted to pivotally couple the cap to the neck and thereby facilitating pivotal movement of the cap between the open position and the closed position about the hinge axis;
   the outer diameter of the cap being greater than the inner neck diameter and the neck height being greater than the cap height to allow the universal receptacle cover to completely cover the standard electrical receptacle when the cap is in the closed configuration, and
   at least one of the base and the neck consisting essentially of a material transparent to visible light to provide visual access to the standard electrical receptacle mating with the universal receptacle cover.

2. The universal receptacle cover of claim 1 wherein the cap consisting essentially of a material transparent to visible light.

3. The universal receptacle cover of claim 2, wherein both the cap and the neck consisting essentially of a material transparent to visible light.

4. The universal receptacle cover of claim 1, wherein the base, the neck and the cap each consisting essentially of a material transparent to visible light.

5. The universal receptacle cover of claim 1, wherein the material transparent to visible light is a colorless material.

6. The universal receptacle cover of claim 1 wherein the base includes a plurality of slots adapted to receive a fastener, wherein the plurality of slots each have an oval-shape.

7. A universal receptacle cover for a standard electrical receptacle, comprising:
   a base;
   a neck supported by the base, the neck having an inner neck diameter and a neck height, the neck adapted to receive a standard electrical receptacle; and
   a cap coupled to the neck, wherein the cap moves between an open configuration and a closed configuration, the cap having a dome located centrally within the cap, a cap height and an outer diameter, the outer diameter of the cap being greater than the inner neck diameter and the neck height being greater than the cap height to allow the universal receptacle cover to completely cover the standard electrical receptacle when the cap is in the closed configuration; and the dome of the cap allowing standard electrical receptacles of varying height to fit inside the receptacle cover when the cap is in the closed configuration.

8. The universal receptacle cover of claim 7, wherein the inner neck diameter is at least about 1.2 inches.

9. The universal receptacle cover of claim 7, wherein the neck height is at least about 1 inch.

10. The universal receptacle cover of claim 7, wherein the cap height is at least about 0.3 inches.

11. The universal receptacle cover of claim 7, wherein the base includes a plurality of slots to receive a fastener, wherein the plurality of slots have an oval shape.

12. The universal receptacle cover of claim 7, wherein at least one of the base, the neck and the cap consisting essentially of a material transparent to visible light to provide visual access to the standard electrical receptacle mating with the universal receptacle cover.

13. The universal receptacle cover of claim 12 wherein substantially the entire receptacle cover consisting essentially of a material transparent to visible light.

14. The universal receptacle cover of claim 7, wherein the inner neck diameter is at least about 1.2 inches, the neck height is at least about 1 inch and the cap height is at least about 0.3 inches.

15. A universal receptacle cover for a standard electrical receptacle, comprising:

a base;

a neck mounted on the base, the neck comprising one or more posts;

a cap pivotally coupled to and supported by the one or more posts of the neck, wherein the cap comprising a pair of arms configured for pivotally moving the cap between an open configuration and a closed configuration relative to the posts; and a connection mechanism comprising a hinge pin and a bracket, the hinge pin extending through holes on the posts of the neck and the bracket for pivotally coupling arms of the cap to the posts of the neck, such that the cap pivots about a pivot axis of the connection mechanism, the connection mechanism being configured for providing a snap-back action to move the cap to the closed position from the open position.

16. The universal receptacle cover of claim 15 wherein the base is square-shaped and includes a plurality of slots adapted to receive a fastener, wherein the plurality of slots each have an oval shape.

17. The universal receptacle cover of claim 15 wherein at least one of the base, the neck and the cap consisting essentially of a material transparent to visible light to provide visual access to the standard electrical receptacle mating with the universal receptacle cover.

18. The universal receptacle cover of claim 17 wherein substantially the entire receptacle cover consisting essentially of a material transparent to visible light.

* * * * *